United States Patent
Aoki et al.

(10) Patent No.: US 10,218,295 B2
(45) Date of Patent: Feb. 26, 2019

(54) MOTOR DRIVE CONTROLLER AND METHOD FOR CONTROLLING MOTOR

(71) Applicant: Minebea Mitsumi Inc., Nagano (JP)

(72) Inventors: Masato Aoki, Iwata (JP); Hiroyuki Kaidu, Iwata (JP); Youhei Serizawa, Kakegawa (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/831,776

(22) Filed: Dec. 5, 2017

(65) Prior Publication Data
US 2018/0159450 A1    Jun. 7, 2018

(30) Foreign Application Priority Data
Dec. 6, 2016 (JP) .................................. 2016-236822

(51) Int. Cl.
| | |
|---|---|
| H02P 6/18 | (2016.01) |
| H02P 6/21 | (2016.01) |
| H02P 1/04 | (2006.01) |
| H02P 29/40 | (2016.01) |
| H02K 1/22 | (2006.01) |
| H02P 6/182 | (2016.01) |

(52) U.S. Cl.
CPC .............. *H02P 6/18* (2013.01); *H02K 1/223* (2013.01); *H02P 1/04* (2013.01); *H02P 6/182* (2013.01); *H02P 6/21* (2016.02); *H02P 29/40* (2016.02)

(58) Field of Classification Search
None
See application file for complete search history.

(56) References Cited

U.S. PATENT DOCUMENTS

| | | | | |
|---|---|---|---|---|
| 4,403,177 A * | 9/1983 | Weber | ...................... | H02P 6/21 318/400.11 |
| 4,757,247 A * | 7/1988 | Ranger | ..................... | H02P 8/32 318/254.1 |
| 5,574,608 A * | 11/1996 | Fukuoka | ............... | H02H 7/093 318/798 |
| 2006/0244408 A1* | 11/2006 | Feil | ........................ | H02H 11/00 318/782 |
| 2015/0295523 A1* | 10/2015 | Kondou | ................... | H02P 1/04 318/431 |

FOREIGN PATENT DOCUMENTS

JP     2011-182505 A    9/2011

* cited by examiner

*Primary Examiner* — Bentsu Ro
(74) *Attorney, Agent, or Firm* — Pearne & Gordon LLP

(57) ABSTRACT

A motor drive controller includes: a motor drive unit; and a lock energization control circuit configured to control the motor drive unit to cause a lock current for holding the rotor at a predetermined lock position to flow from the motor drive unit to the drive coils for lock energization duration before rotation of the motor is started. The lock energization control circuit includes: a first lock energization unit that controls the motor drive unit such that a magnitude of the lock current becomes a first predetermined value when first predetermined duration has elapsed after the lock energization duration is started; and a second lock energization unit that controls the motor drive unit such that the magnitude of the lock current becomes a second predetermined value smaller than the first predetermined value when the lock energization duration is terminated after the first predetermined duration has elapsed.

11 Claims, 12 Drawing Sheets

FIG. 4
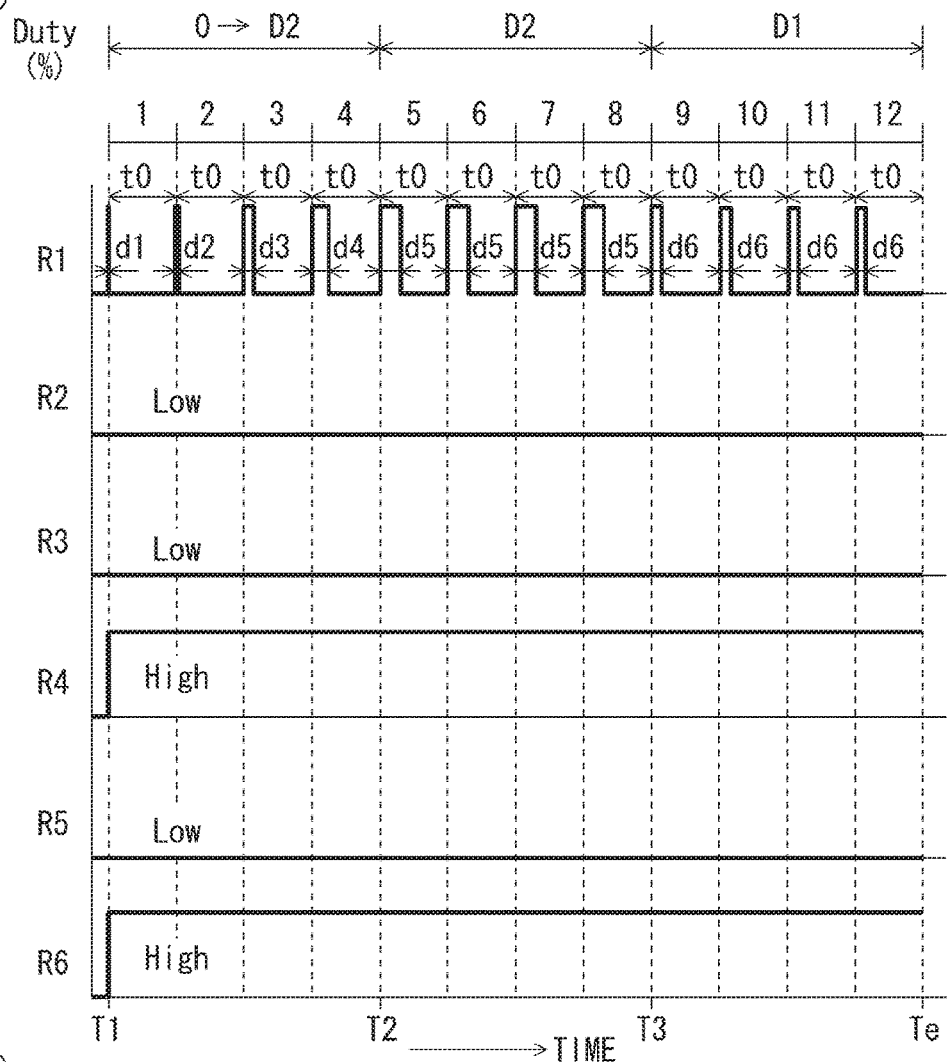
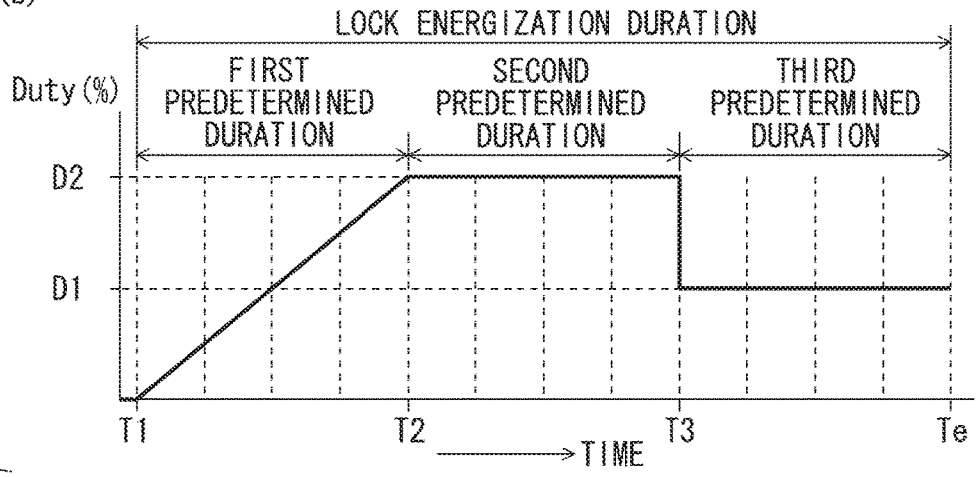

MOTOR DRIVE CONTROLLER AND METHOD FOR CONTROLLING MOTOR

CROSS-REFERENCE TO RELATED APPLICATION

This application claims priorities from Japanese Patent Application No. 2016-236822 filed on Dec. 6, 2016, the entire subject matters of which is incorporated herein by reference.

TECHNICAL FIELD

The present disclosure relates to a motor drive controller and a method for controlling a motor, and particularly to a motor drive controller and a method for controlling a motor, both of which do not use a sensor device for detecting a position of a rotor.

BACKGROUND

In a motor drive controller for driving a motor without using a sensor device for detecting a position of a rotor (hereinafter referred to as a "position sensor-less system"), there is a need to perform positioning of the rotor at the time of starting. As a method of performing the positioning, for example, a lock energization method for locking a rotor at a predetermined position by switching on upper and lower switching elements, each of which has a predetermined phase and is provided in an inverter circuit for supplying power to coils of a motor, for a fixed time is known.

An example of a drive controller for a motor is described in JP-A-2011-182505 in which a rotor is controlled such that a lock current is increased from the onset of starting over a predetermined time until a magnitude of the lock current reaches a predetermined value, then an energized state of the lock current having a predetermined magnitude continues for a fixed time, and thereby the rotor is reliably stopped at a predetermined position.

Meanwhile, when the motor for rotating, for instance, a driven element having large moment of inertia is allowed to be driven by the motor drive controller, a starting time required to perform lock energization at the time of starting to enable the rotation of the motor may be prolonged.

For example, in a case in which a driven element having large inertia is mounted on a rotor like a fan motor using a large vane (an impeller), when the vane moves toward a lock position by performing lock energization, the rotor is rotated by inertia of the vane up to a position at which the vane exceeds the lock position. As a result, torque is applied to the rotor in the opposite direction to return to the lock position, and the rotor is stopped at the position beyond the lock position for the moment, and then moves toward the lock position in a direction opposite to the just previous direction. A position at which a rotational speed of the rotor becomes zero by repeating this operation approaches the lock position, and the rotor can be finally stopped at the lock position. That is, when the moment of inertia of the rotor is large, an ON duty PWM signal having a magnitude to some extent needs to be output to the motor to move the rotor toward the lock position. However, although the ON duty PWM signal is output for a fixed time, the rotor cannot be completely locked immediately. As the inertia of the vane increases, a time until the rotor comes to a stop is prolonged.

SUMMARY

One of objects of the present disclosure is to provide a motor drive controller capable of being driven in a position sensor-less system and reducing a starting time, and a method for controlling a motor.

According to an illustrative embodiment of the present disclosure, there is provided a motor drive controller that drives a motor without using a sensor device for detecting a position of a rotor, the motor drive controller including: a motor drive unit configured to selectively energize drive coils of a plurality of phases of the motor; and a lock energization control circuit configured to control the motor drive unit to cause a lock current for holding the rotor at a predetermined lock position to flow from the motor drive unit to the drive coils for lock energization duration before rotation of the motor is started. The lock energization control circuit includes: a first lock energization unit that controls the motor drive unit such that a magnitude of the lock current becomes a first predetermined value when first predetermined duration has elapsed after the lock energization duration is started; and a second lock energization unit that controls the motor drive unit such that the magnitude of the lock current becomes a second predetermined value smaller than the first predetermined value when the lock energization duration is terminated after the first predetermined duration has elapsed.

According to another illustrative embodiment of the present disclosure, there is provided a method for controlling a motor which performs control of causing a lock current for holding a rotor at a predetermined lock position to flow to drive coils for lock energization duration before rotation of the motor is started and selectively energizes the drive coils of a plurality of phases of the motor to drive the motor without using a sensor for detecting a position of the rotor. The method includes: a first lock energization step of performing control such that a magnitude of the lock current becomes a first predetermined value when first predetermined duration has elapsed after the lock energization duration is started; and a second lock energization step of performing control such that the magnitude of the lock current becomes a second predetermined value smaller than the first predetermined value when the lock energization duration is terminated after the first predetermined duration has elapsed.

BRIEF DESCRIPTION OF THE DRAWINGS

In the accompanying drawings:

FIG. 4 shows a timing chart and a graph which illustrate an operation of the motor drive controller at the time of lock energization;

DETAILED DESCRIPTION

Hereinafter, a motor drive controller according to an embodiment of the present disclosure will be described.

Figure 1:
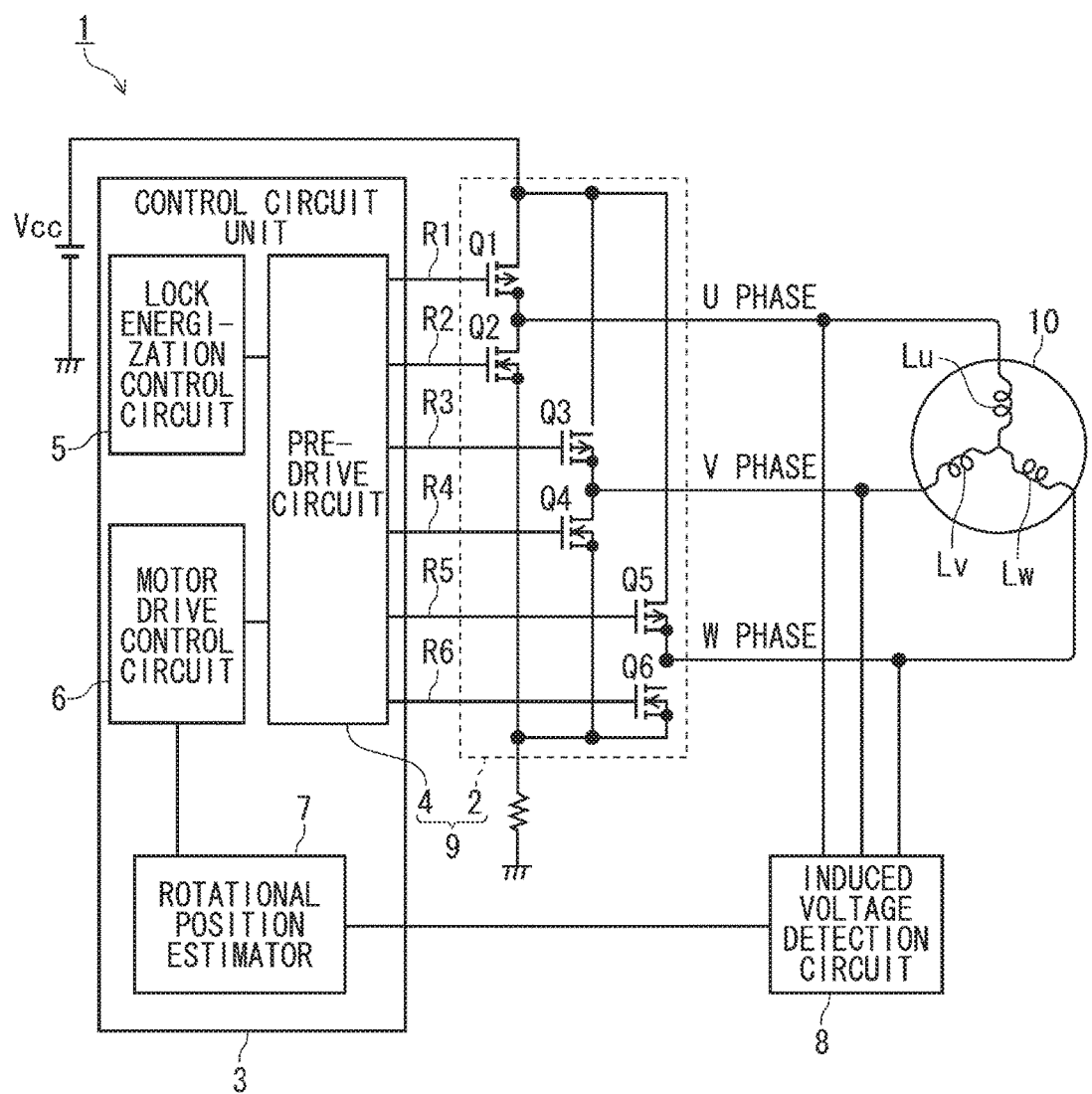
FIG. 1 is a diagram illustrating a configuration of a motor drive controller in an embodiment of the present disclosure.

FIG. 1 is a diagram illustrating a configuration of a motor drive controller 1 according to an embodiment of the present disclosure.

As illustrated in FIG. 1, a motor drive controller 1 includes an inverter circuit 2, a control circuit unit 3, and an induced voltage detection circuit 8. The motor drive controller 1 supplies a synchronous motor 10 with drive power, and drives the synchronous motor 10. The synchronous motor 10 in the present embodiment is a three-phase motor having U-, V-, and W-phase drive coils Lu, Lv, and Lw. The synchronous motor 10 is a sensorless synchronous motor that does not have a sensor for detecting a position of a rotor. That is, the motor drive controller 1 is a position sensor-less system-based motor drive controller that does not use any sensor device for detecting the position of the rotor.

The induced voltage detection circuit 8 is connected to current supply lines from the inverter circuit 2 to the U-, V-, and W-phase drive coils Lu, Lv, and Lw of the synchronous motor 10 respectively, and detects an induced voltage from the drive coil of each phase. The detection result is output to the control circuit unit 3.

The inverter circuit 2, together with a pre-drive circuit 4 of the control circuit unit 3, serves as a motor drive unit 9 that applies a current to each phase of the synchronous motor 10. The inverter circuit 2 selectively energizes the drive coil of each phase of the synchronous motor 10 based on drive signals R1 to R6 output from the pre-drive circuit 4, and controls rotation of the synchronous motor 10. The inverter circuit 2 selectively energizes the drive coil of each phase in response to counter-electromotive voltages generated from the drive coils Lu, Lv, and Lw of the three phases based on control caused by the control circuit unit 3.

In the present embodiment, the inverter circuit 2 includes six switching elements Q1 to Q6 for supplying each of the drive coils Lu, Lv, and Lw of the synchronous motor 10 with a drive current. The switching elements Q1, Q3, and Q5 are high side switching elements, each of which is formed of a P-channel metal-oxide-semiconductor field effect transistor (MOSFET) disposed on a positive side of a DC power supply Vcc. The switching elements Q2, Q4, and Q6 are low side switching elements, each of which is formed of an N-channel MOSFET disposed on a negative side of the DC power supply Vcc. The two switching elements are connected in series in each of a combination of the switching elements Q1 and Q2, a combination of the switching elements Q3 and Q4, and a combination of the switching elements Q5 and Q6. These three sets of series circuits are connected in parallel to serve as a bridge circuit. A connection point between the switching elements Q1 and Q2 is connected to the U-phase drive coil Lu, a connection point between the switching elements Q3 and Q4 is connected to the V-phase drive coil Lv, and a connection point between the switching elements Q5 and Q6 is connected to the W-phase drive coil Lw.

The control circuit unit 3 has the pre-drive circuit 4, a lock energization control circuit 5, a motor drive control circuit 6, and a rotational position estimator 7. The control circuit unit 3 may be formed using, for instance, a programmable device such as a digital signal processor (DSP), a field programmable gate array (FPGA), or a microcomputer.

The rotational position estimator 7 estimates a rotational position of a rotor of the synchronous motor 10 based on the detection result of the induced voltage detection circuit 8. The motor drive control circuit 6 controls an operation of the pre-drive circuit 4 according to the rotational position of the rotor estimated by the rotational position estimator 7. The motor drive control circuit 6 controls an operation from forced commutation after lock energization to sensorless drive.

The lock energization control circuit 5 controls an operation of the lock energization that locks the rotor at a predetermined position when the synchronous motor 10 is started. That is, the lock energization control circuit 5 controls the motor drive unit 9 to cause a lock current for holding the rotor at a predetermined lock position to flow from the motor drive unit 9 to the drive coils Lu, Lv, and Lw for lock energization duration before the rotation of the synchronous motor 10 is initiated.

The pre-drive circuit 4 includes a plurality of output terminals that are connected to gate terminals of the six switching elements Q1 to Q6 of the inverter circuit 2. The drive signals R1 to R6 are output from the respective output terminals to control ON/OFF operation of the switching elements Q1 to Q6. During sensorless drive, the pre-drive circuit 4 outputs the drive signals R1 to R6 in response to the counter-electromotive voltages generated from the drive coils Lu, Lv, and Lw of the respective phases based on the control of the motor drive control circuit 6. That is, the inverter circuit 2 selectively energizes each of the drive coils based on the counter-electromotive voltages generated from the drive coils Lu, Lv, and Lw of the respective phases of the synchronous motor 10.

Here, a basic operation of the motor drive controller 1 will be simply described.

Figure 2:
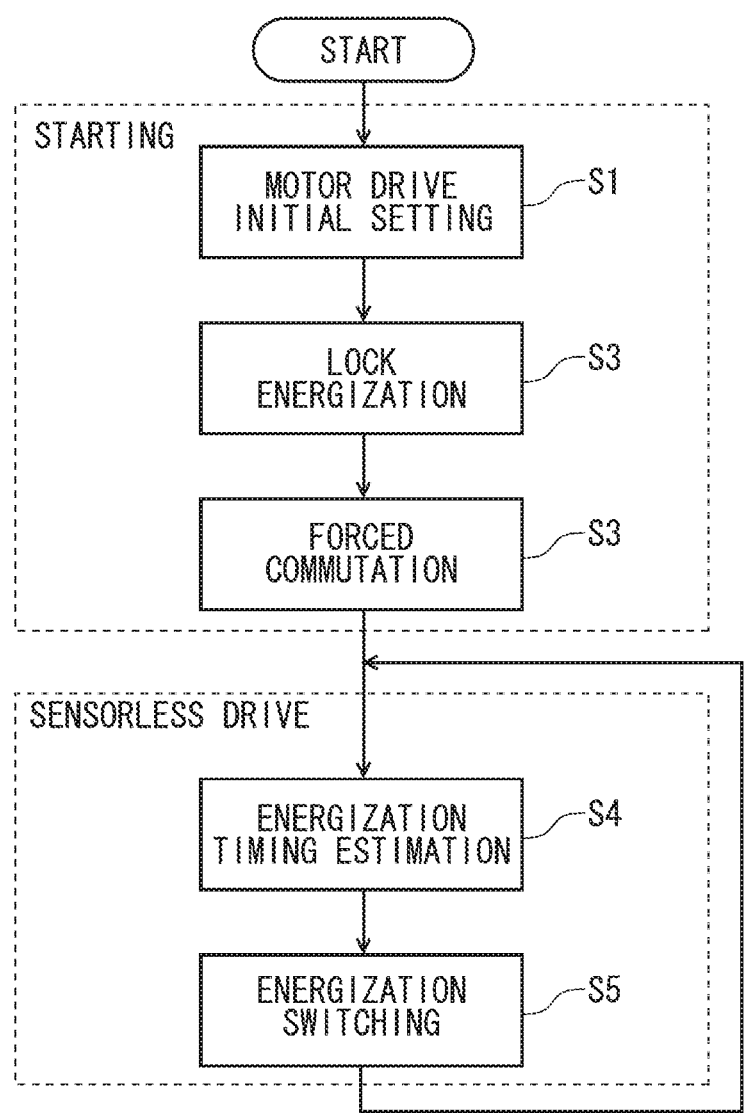
FIG. 2 is a flow chart illustrating a basic operation of the motor drive controller.

FIG. 2 is a flow chart illustrating a basic operation of the motor drive controller 1.

As illustrated in FIG. 2, the motor drive controller 1 generally performs two operations of a starting process (from step S1 to step S3), and a sensorless drive process (from step S4 to step S5).

The motor drive controller 1 sets various specifications (a port, a timer, etc.) of the control circuit unit 3 formed of a microcomputer or the like to meet drive conditions of the synchronous motor 10 when the starting is initiated in a motor drive initial setting process (step S1).

Next, the process moves on to a lock energization process. A lock energization control signal is output from the lock energization control circuit 5 to the pre-drive circuit 4. The pre-drive circuit 4 performs the ON/OFF operation of the switching elements Q1 to Q6 of the inverter circuit 2 according to the lock energization control signal. Thereby, a lock current flows to the drive coils Lu, Lv, and Lw of the respective phases (the U, V, and W phases) of the synchronous motor 10, and the rotor of the synchronous motor 10 is locked at a predetermined position (step S2). The operation of this lock energization process will be described below in detail.

Next, the process moves on to a forced commutation process. A drive control signal is output from the motor drive control circuit 6 to the pre-drive circuit 4. The pre-drive circuit 4 performs the ON/OFF operation of the switching elements Q1 to Q6 of the inverter circuit 2 according to the drive control signal. Thereby, a drive current sequentially flows to the drive coils Lu, Lv, and Lw of the respective phases (the U, V, and W phases) of the synchronous motor 10, and a rotational speed of the rotor is gradually accelerated to a fixed speed (step S3).

Afterwards, when the speed of the rotor reaches the fixed rotational speed, the operation of the sensorless drive process is performed. The motor drive controller 1 starts a normal sensorless drive in an energization timing estimation process. The rotational position estimator 7 of the control circuit unit 3 detects a zero-cross point from a change in the induced voltage of each phase, and estimates an energization timing (step S4).

The process moves on to an energization switching process. The motor drive control circuit 6 switches energization to each phase with the energization timing estimated by the rotational position estimator 7, and continues with constant speed rotation of the synchronous motor 10 (step S5).

As described above, the motor drive controller 1 according to the present embodiment performs a normal rotation operation after the operation steps of FIG. 2.

Next, a specific operation method of the lock energization process will be described.

Figure 3:
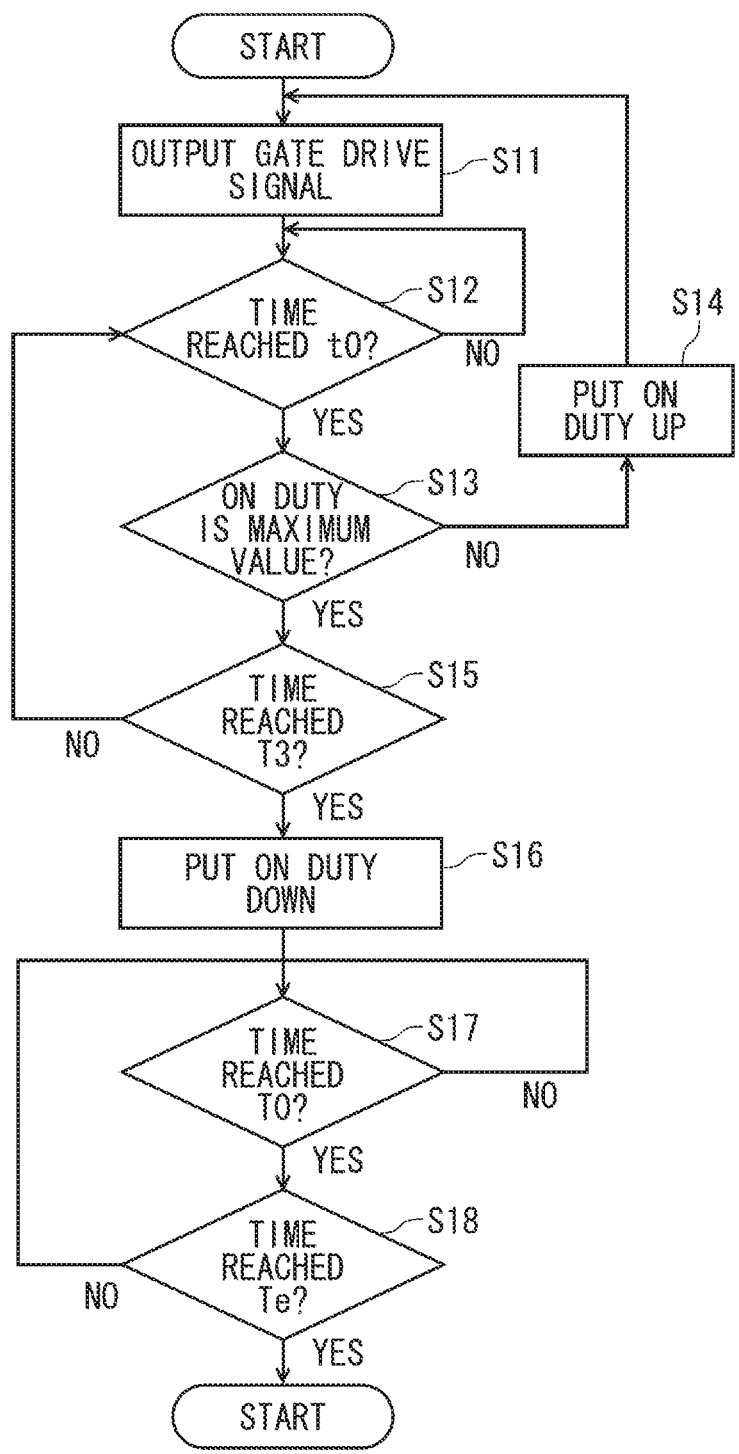
FIG. 3 is a flow chart illustrating control of a lock energization process.

FIG. 3 is a flow chart illustrating control of the lock energization process.

As will be described below, the lock energization control circuit has first lock energization unit for controlling the motor drive unit 9 such that a magnitude of the lock current becomes a first predetermined value when first predetermined duration has elapsed after the lock energization duration is started, and second lock energization unit for controlling the motor drive unit 9 such that the magnitude of the lock current becomes a second predetermined value smaller than the first predetermined value when the lock energization duration is terminated after the first predetermined duration has elapsed. That is, as illustrated in FIG. 3, in the present embodiment, the lock energization control circuit 5 uses the first lock energization unit to control the motor drive unit 9 such that the magnitude of the lock current becomes the first predetermined value when the first predetermined duration (the first predetermined duration) has elapsed after the lock energization duration is started (from step S11 to step S15; an example of a first lock energization step). The lock energization control circuit 5 uses the second lock energization unit to control the motor drive unit 9 such that the magnitude of the lock current becomes the second predetermined value when the lock energization duration is terminated after the first predetermined duration has elapsed (from step S16 to step 18; an example of a second lock energization step). The second predetermined value is smaller than the first predetermined value.

The lock energization control circuit 5 changes ON duty of a PWM signal (a pulse signal) that is output from the pre-drive circuit 4 to one or both of the high side switching element and the low side switching element provided for the phase (sometimes referred to as a first phase) of any one of the drive coils, and thereby changes the magnitude of the lock current. That is, the control caused by the lock energization control circuit 5 is performed, and thereby the pre-drive circuit 4 outputs the PWM signal to the high side switching element of the first phase. The low-level drive signals are output to the low side switching element of the first phase and the high side switching elements of the phases other than the first phase. The high-level drive signals are output to the low side switching elements of the respective phases other than the first phase.

In the present embodiment, the lock energization control circuit 5 changes the ON duty of the PWM signal output to the high side switching element Q1 provided for the U phase (an example of the first phase), and thereby changes the magnitude of the lock current. That is, the control caused by the lock energization control circuit 5 is performed, and thereby the pre-drive circuit 4 outputs the drive signal R1 that is the PWM signal to the high side switching element Q1 of the U phase. The low-level drive signals R2, R3, and R5 are output to the low side switching element Q2 of the U phase and the high side switching elements Q3 and Q5 of the V and W phases. The high-level drive signals R4 and R6 are output to the low side switching elements Q4 and Q6 of the V and W phases.

In step S11, when the lock energization of the rotor is started at a predetermined time, the lock energization control circuit 5 outputs the lock energization control signal to the pre-drive circuit 4. The pre-drive circuit 4 outputs gate drive signals based on the lock energization control signal to the inverter circuit 2. At this time, the PWM signal acting as the gate drive signal is output to the specified switching element Q1 among the switching elements Q1 to Q6 of the inverter circuit 2. Any one of the high-level gate drive signal or the low-level gate drive signal is output to the switching elements other than the switching element Q1.

Next, it is determined in step S12 whether or not an output time of a present gate drive signal reaches a predetermined time t0. That is, a first gate drive signal continues to be input until an input time thereof reaches the predetermined time t0. When the time reaches the predetermined time t0, the result in step S12 becomes "YES," and the process proceeds to step S13.

Next, it is determined in step S13 whether or not the ON duty of the PWM signal output to the specified switching element Q1 is a preset maximum value (first ON duty). When the ON duty does not reach the maximum value, the result becomes "NO," and the process proceeds to step S14.

In step S14, the ON duty of the PWM signal increases. Afterwards, the process returns to step S11, and the PWM signal whose ON duty increases is input to the specified switching element Q1 as the gate drive signal. The process proceeds to steps S12 and S13, and when the result in step S13 becomes "NO" again, the operations subsequent to step S14 are repeated.

When the ON duty of the PWM signal output to the specified switching element reaches the preset maximum value (the first ON duty) in step S13, the result in step S13 becomes "YES," and the process proceeds to step S15.

In step S15, it is determined whether or not a lock energization time of the rotor reaches a preset predetermined time T3. If not, the result becomes "NO," the process returns to step S12, and the subsequent steps are repeated.

In step S15, when it is determined that the lock energization time of the rotor reaches the preset predetermined time T3, the result becomes "YES," and the process moves to processes subsequent to step S16.

In this way, in the first lock energization step, the ON duty of the PWM signal (the drive signal R1) is controlled to increase along with the elapse of time such that the magnitude of the lock current increases over a predetermined time until it becomes a first predetermined value.

In step S16, the lock energization control circuit 5 outputs the lock energization control signal to the pre-drive circuit 4, and puts the ON duty of the PWM signal down. For example, the lock energization control signal is output such that the ON duty becomes a second ON duty smaller than the first ON duty (such that the magnitude of the lock current becomes a second predetermined value smaller than the first predetermined value).

In step S17, it is determined whether or not the output time of the gate drive signal reaches a predetermined time t0. When the output time reaches the predetermined time t0, the process proceeds to step S18.

In step S18, it is determined whether or not the time reaches a lock energization termination time Te. When it is determined that the lock energization time reaches a preset predetermined time T3, the result becomes "YES," and the lock energization process of the rotor is completed.

FIG. 4 shows a timing chart illustrating an operation of the motor drive controller 1 at the time of lock energization.

Section (a) of FIG. 4 shows a timing chart illustrating a correlation of waveforms of the drive signals R1 to R6 output from the inverter circuit 2 to the respective switching elements Q1 to Q6, and section (b) of FIG. 4 shows a diagram illustrating a change in ON duty of the gate drive signal of the high side switching element Q1 of the U phase over time. Since the inverter circuit 2 is driven in response to the PWM signal, a magnitude of the current flowing to the U-phase drive coil Lu is also changed over time in the same way as the change of the ON duty.

In section (a) of FIGS. 4, R1 to R6 represent waveforms of the drive signals (gate drive signals) output to the gate terminals of the switching elements Q1 to Q6 of the inverter circuit 2.

When the lock energization of the rotor is started at a point in time when a time is T1, the lock energization control signal is output from the lock energization control circuit 5 to the pre-drive circuit 4, and the pre-drive circuit 4 outputs the gate drive signals based on the lock energization control signal to the inverter circuit 2. In a period 1, a PWM signal of an ON duty d1 is output to the gate terminal of the switching element (the high side switching element of the U phase) Q1 of the inverter circuit 2 by one pulse. It is determined whether or not an input time of the PWM signal reaches a preset predetermined time t0 (step S12 of FIG. 3). When it is determined that the input time reaches t0, it is then determined whether or not the ON duty reaches a preset maximum value of the ON duty (step S13 of FIG. 3). When it is determined that the ON duty d1 does not reach the preset maximum value, the period moves to the next period 2, and the PWM signal, the ON duty of which is d2 greater than d1, is output. It is determined whether or not the input time of the PWM signal reaches t0 (step S12 of FIG. 3). When it is determined that the time reaches t0, it is determined whether or not the ON duty d2 reaches a preset maximum value of the ON duty (step S13 of FIG. 3). When it is determined that the ON duty d2 does not reach the preset maximum value, a PWM signal of an ON duty d3 obtained by further putting the ON duty up is output in the next period 3 (step S14 of FIG. 3). In this way, the ON duty of the PWM signal reaches the preset maximum value that an operation in which the PWM signal whose ON duty increases is output to the switching element Q1 at intervals of the predetermined time t0 is repeated (steps S11 to S14 of FIG. 3). The PWM signal of a plurality of cycles may be included within each period (the predetermined time t0).

In the present embodiment, in the periods 1 to 4, it is determined that the ON duty of the PWM signal of the switching element Q1 does not reach the preset maximum value d5 (a first ON duty D2). For this reason, as illustrated in section (b) of FIG. 4, duration (an example of the first predetermined duration) from a time T1 when the period 1 is started to a time T2 when the period 4 is completed, the ON duty gradually increases, and becomes the first ON duty D2 at the time T2. When the first ON duty D2 is output, the magnitude of the lock current becomes the first predetermined value.

When the time becomes T2, it is determined that the ON duty of the PWM signal of the switching element Q1 becomes the preset maximum value d5 (step S14 of FIG. 3) at a point in time when the next period 5 is started, and the PWM signal, the ON duty of which is fixed to the maximum value d5, is input. It is determined whether or not the time reaches T3 (a time T3) (step S15 of FIG. 3). Until it is determined that the time reaches T3 that the PWM signal, the ON duty of which is fixed to the maximum value d5, is continuously output to the switching element Q1. That is, the state in which the ON duty of the PWM signal is the first ON duty D2 is maintained from the time T2 to the time T3. This duration is predetermined duration (second predetermined duration).

In the present embodiment, as illustrated in section (a) of FIG. 4, the PWM signal of the first ON duty D2 is output from the period 5 to a period 8. In association with this, the lock current flowing to the U-phase drive coil Lu becomes a fixed current value (a first predetermined value) in the duration from the time T2 to the time T3.

When the time becomes T3, the ON duty of the PWM signal of the switching element Q1 is changed into a preset ON duty d6 (a second ON duty D1 smaller than the first ON duty D2) in the next period 9 (step S16 of FIG. 3). It is determined whether or not the time runs beyond t0 (step S17 of FIG. 3), and it is determined whether or not the time reaches Te (a time Te) (step S18 of FIG. 3). Until it is determined that the time reaches Te that the PWM signal, the ON duty of which is fixed to d6, is continuously output to the switching element Q1. That is, the state in which the ON duty of the PWM signal is the second ON duty D1 is maintained from the time T3 to the time Te. This duration is predetermined duration (third predetermined duration). In the present embodiment, the third predetermined duration is set to be longer than the second predetermined duration.

In the present embodiment, as illustrated in section (a) of FIG. 4, the PWM signal of the second ON duty D1 is output from the period 9 to a period 12. In association with this, the lock current flowing to the U-phase drive coil Lu becomes a fixed current value (a second predetermined value smaller than the first predetermined value) in the duration from the time T3 to the time Te.

When the time Te arrives, the lock energization process is completed.

As illustrated in section (a) of FIG. 4, the low-level gate drive signals R2, R3, and R5 are output to the gate terminals of the switching elements Q2 (the low side switching element of the U phase), Q3 (the high side switching element of the V phase), and Q5 (the high side switching element of the W phase) in the duration from time T1 to the time Te. The high-level gate drive signals R4 and R6 are output to the gate terminals of the switching elements Q4 (the low side switching element of the V phase) and Q6 (the low side switching element of the W phase). Thereby, the current flowing to the U-phase drive coil Lu flows to GND through the V-phase drive coil Lv, the switching element Q4, and a resistance element, and flows to the GND through the W-phase drive coil Lw, the switching element Q6, and a resistance element.

In the above description, the lock energization process is performed from the time T1 to the time Te when predetermined lock energization duration has elapsed. An increment of the ON duty per time or change timing after the lock energization duration is started is preset. The time T2 from the time T1 to the time T2 is the first predetermined duration. A time from the T2 when the first predetermined duration is terminated to the time T3 when the time T3 has elapsed from the time T1 is the second predetermined duration. A length of the input time tO and an increase rate of the ON duty are adjusted according to the specification or the like of the motor. Thereby, a degree of inclination to which the lock current increases or a time until the magnitude of the lock current reaches the first predetermined value can be adequately set.

A length of each duration and a magnitude of the first ON duty D2 or the second ON duty D1 may be set, for instance, as follows. For example, the first predetermined duration may be set to be less than or equal to one second, the second predetermined duration may be set to about two seconds, and the third predetermined duration may be set to about two seconds. The second predetermined duration may be slightly shorter than the third predetermined duration. The first ON duty D2 may be set to, for instance, a range from 2% to 60%, and more preferably a range from 5% to 20%. To be specific, the first ON duty D2 may be set to, for instance, 6%. The second ON duty D1 may be set to, for instance, a range from 1% to 30% and more preferably a range from 2% to 10%, and may be set to be smaller than the first ON duty D2. The second ON duty D1 may be determined in combination with the first ON duty D2, and is generally fit to be the half of the first ON duty D2.

The first ON duty D2 and the second ON duty D1 may be set according to a length of the lock energization duration or lengths of the first, second, and third predetermined duration. To be specific, when these durations are relatively short, the first ON duty D2 or the second ON duty D1 may be set to be relatively large. As a magnitude of a magnetic force used in the synchronous motor 10 becomes large, the positioning of the rotor can be rapidly performed. Thus, the first ON duty D2 or the second ON duty D1 may be set to be small.

A lower limit of the second ON duty D1 may be set to a value with which a position can be held even if a force of reverse rotation is applied to the vane mounted on the rotor of the synchronous motor 10. An upper limit of the first ON duty D2 may be set to such a value that heat generation of a circuit component enters derating (a margin in design) even if lock protection functions to fall into a state in which continuous operation is impossible. That is, the heat generation differs depending on a winding or an electronic circuit of the synchronous motor 10 to be used, and thereby the first ON duty D2 is affected. A magnitude of the moment of inertia is changed by the vane to be used, and thereby the first ON duty D2 and the second ON duty D1 are affected. A preferred value can be determined, for instance, by performing an experiment or simulation.

When the lock energization is performed, if the lock energization is performed with one constant duty, there is a variation in the magnitude of inertia of each driven element, and thereby lock may not be completely applied. When lock is applied only with a large duty for a long time, the heat generation may become a problem. A possibility that complete lock is not applied only with a small duty is enhanced.

In contrast, in the present embodiment, after the magnitude of the lock current is set to the first predetermined value, control of changing to the second predetermined value smaller than the first predetermined value is performed. The lock energization is performed with the first ON duty D2 first, and then the lock energization is performed with the second ON duty D1 smaller than the first ON duty D2. For this reason, when the synchronous motor 10 is started, the rotor can be reliably rotated toward a predetermined position even when an external load is applied to the rotor, and the rotor can be rapidly stopped at a predetermined position. For this reason, as a result, a complete and secure lock can be performed in a short time. The lock of the rotor of the synchronous motor 10 can be completed for short lock energization duration, and thus the synchronous motor 10 can be rapidly started.

Since the magnitude of the lock current is adjusted by making the ON duty of the PWM signal variable, the control is made easy.

In the present embodiment, the third predetermined duration (from the time Te to the time T3) is set to be longer than or equal to the second predetermined duration (from the time T3 to the time T2). Therefore, wobble of the driven element such as the vane mounted on the rotor can be prevented, and the rotor can be rapidly stopped. The heat generation is prevented (because the large duty is short), and swing is suppressed (by lengthening the small duty). It is possible to smoothly enter a lock state.

In the first predetermined duration, the control is performed such that the ON duty gradually increases. Therefore, the rotor can reliably move toward a lock position while preventing loss of synchronism of the synchronous motor 10.

Hereinafter, modifications relating to output mode of PWM signal will be described.

An output mode of the ON duty of the PWM signal output from the pre-drive circuit 4 is not limited to the above modes, and may be changed as follows. The PWM signal can be output in each output mode based on the control of the lock energization control circuit 5. When the ON duty is adapted to be gently reduced, a lock operation is smoothly performed, and a starting operation of the synchronous motor 10 can be performed in the same way as with a sensor.

Figure 5:
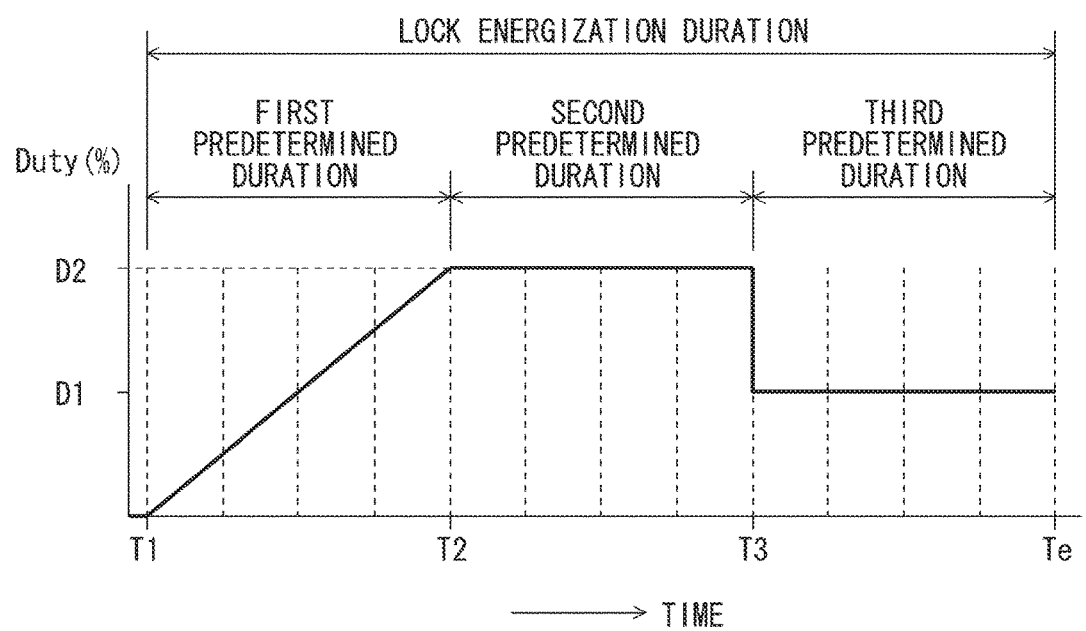
FIG. 5 is a graph illustrating an output mode (a) of a PWM signal according to the present embodiment.

FIG. 5 is a graph illustrating an output mode (a) of the PWM signal according to the present embodiment.

In FIG. 5, the output mode (a) according to the above embodiment is illustrated. In the following description, as in the output mode (a), a time T1 is a lock energization start time, and a time Te is a lock energization completion time. That is, duration from the time T1 to the time Te is lock energization duration.

Figure 6:
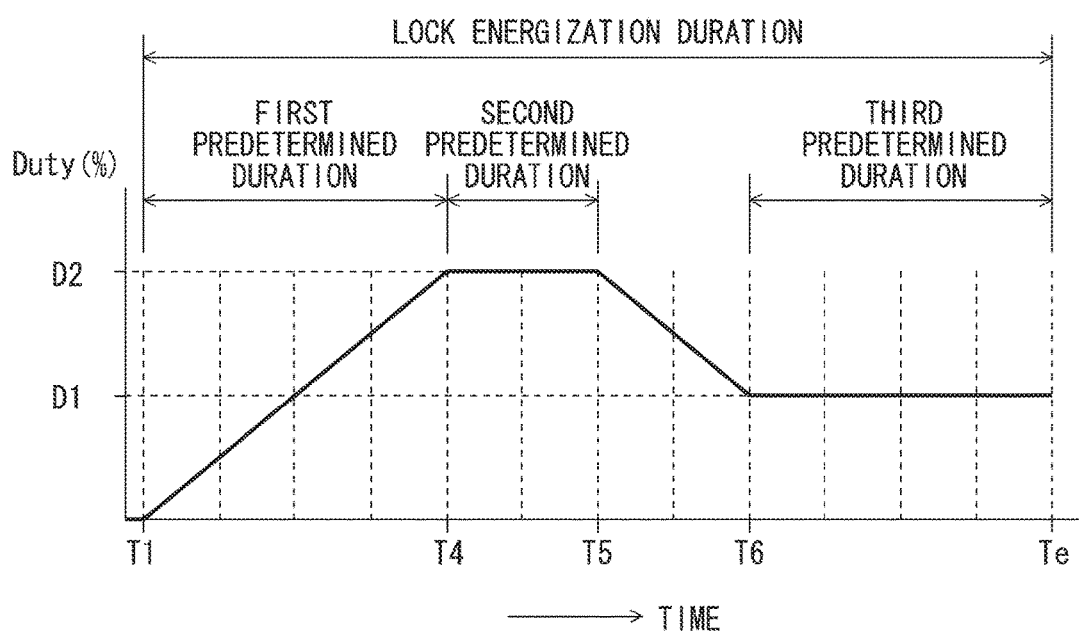
FIG. 6 is a graph illustrating an output mode (b) of the PWM signal according to a modification of the present embodiment.

FIG. 6 is a graph illustrating an output mode (b) of the PWM signal according to a modification of the present embodiment.

As illustrated in FIG. 6, in the output mode (b), duration from a time T1 to a time T4 is first predetermined duration. Duration from the time T4 to a time T5 is second predetermined duration for which a first ON duty D2 is maintained. Duration from a time T6 to a time Te is third predetermined duration for which a second ON duty D1 is maintained.

In the output mode (b), for duration between the second predetermined duration and the third predetermined duration (duration from the time T5 to the time T6), an ON duty of the PWM signal varies from D2 to D1 over time. Even with this configuration, as described above, the rotor can be smoothly stopped at a lock position.

Figure 7:
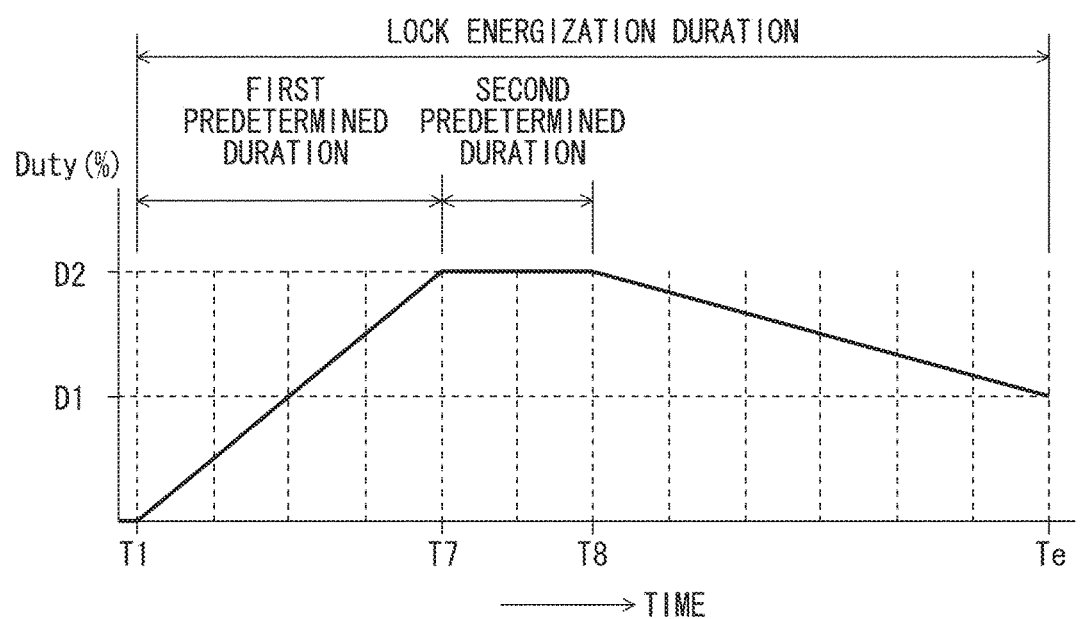
FIG. 7 is a graph illustrating an output mode (c) of the PWM signal according to a modification of the present embodiment.

FIG. 7 is a graph illustrating an output mode (c) of the PWM signal according to a modification of the present embodiment.

As illustrated in FIG. 7, in the output mode (c), duration from a time T1 to a time T7 is first predetermined duration. Duration from the time T7 to a time T8 is second predetermined duration for which a first ON duty D2 is maintained.

In the output mode (c), an ON duty of the PWM signal from the time T8 to a time Te varies from the first ON duty D2 to a second ON duty D1 over time. That is, at the time Te when lock energization duration is terminated, the PWM signal becomes the second ON duty D1, and a magnitude of a lock current becomes a second predetermined value. Even with this configuration, as described above, the rotor can be smoothly stopped at a lock position.

Figure 8:
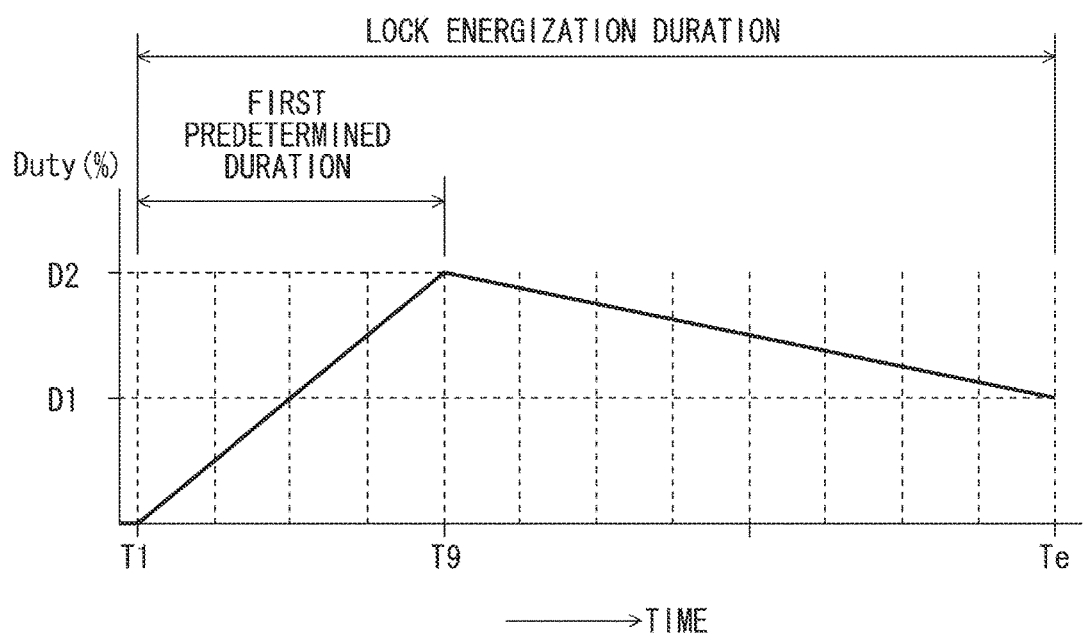
FIG. 8 is a graph illustrating an output mode (d) of the PWM signal according to a modification of the present embodiment.

FIG. 8 is a graph illustrating an output mode (d) of the PWM signal according to a modification of the present embodiment.

As illustrated in FIG. 8, in the output mode (d), duration from a time T1 to a time T9 is first predetermined duration. In the output mode (d), after an ON duty of the PWM signal reaches a first ON duty D2 at the time T9, the ON duty from the time T9 to a time Te immediately varies from the first ON duty D2 to a second ON duty D1 over time. Even with this configuration, as described above, the rotor can be smoothly stopped at a lock position.

Figure 9:
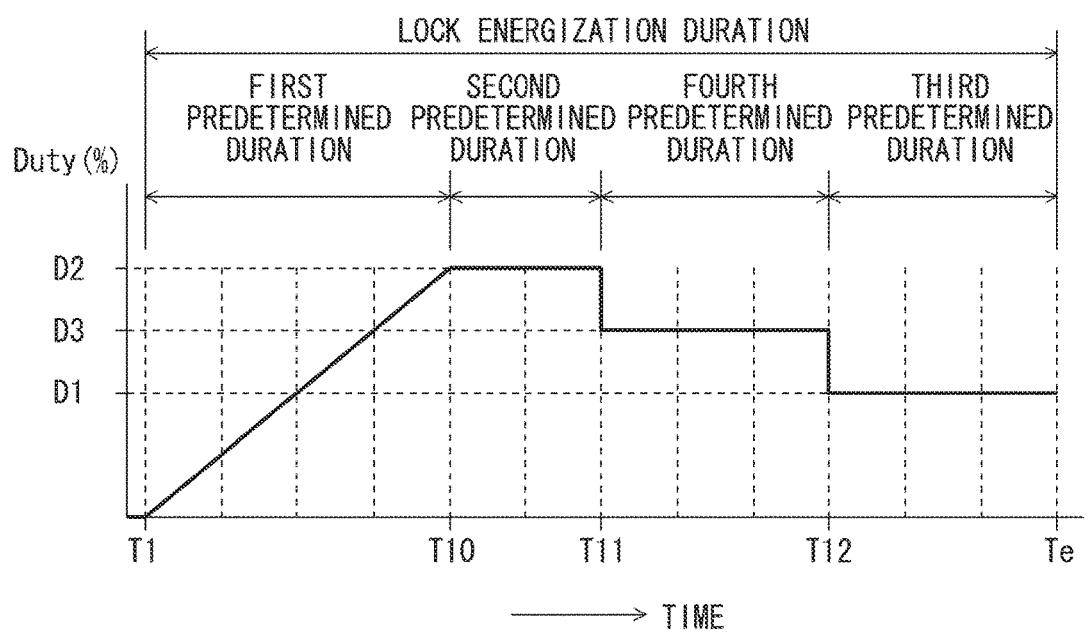
FIG. 9 is a graph illustrating an output mode (e) of the PWM signal according to a modification of the present embodiment.

FIG. 9 is a graph illustrating an output mode (e) of the PWM signal according to a modification of the present embodiment.

As illustrated in FIG. 9, in the output mode (e), duration from a time T1 to a time T10 is first predetermined duration. Duration from the time T10 to a time T11 is second predetermined duration for which a first ON duty D2 is maintained. Duration from a time T12 to a time Te is third predetermined duration for which a second ON duty D1 is maintained.

In the output mode (e), for duration until an ON duty of the PWM signal varies from the first ON duty D2 to the second ON duty D1 (duration from the time T11 to the time T12), the ON duty of the PWM signal is set to a third ON duty D3. The third ON duty D3 is smaller than the first ON duty D2, and is larger than the second ON duty D1. In the output mode (e), the ON duty is switched to the third ON duty D3 at the time T11, and is switched to the second ON duty D1 at the time T12. A state in which the PWM signal of the third ON duty D3 is output is maintained for fourth predetermined duration (from the time T11 to the time T12).

In this way, retention duration at the third ON duty D3 is inserted until the ON duty is reduced from the first ON duty D2 to the second ON duty D1, and thereby more adequate lock control is possible. For example, when there is rust or dust capable of interfering with the rotation of the rotor, the duty is gradually reduced. Thereby, the rust or the dust can be gradually removed, and the rotor can be reliably locked.

Figure 10:
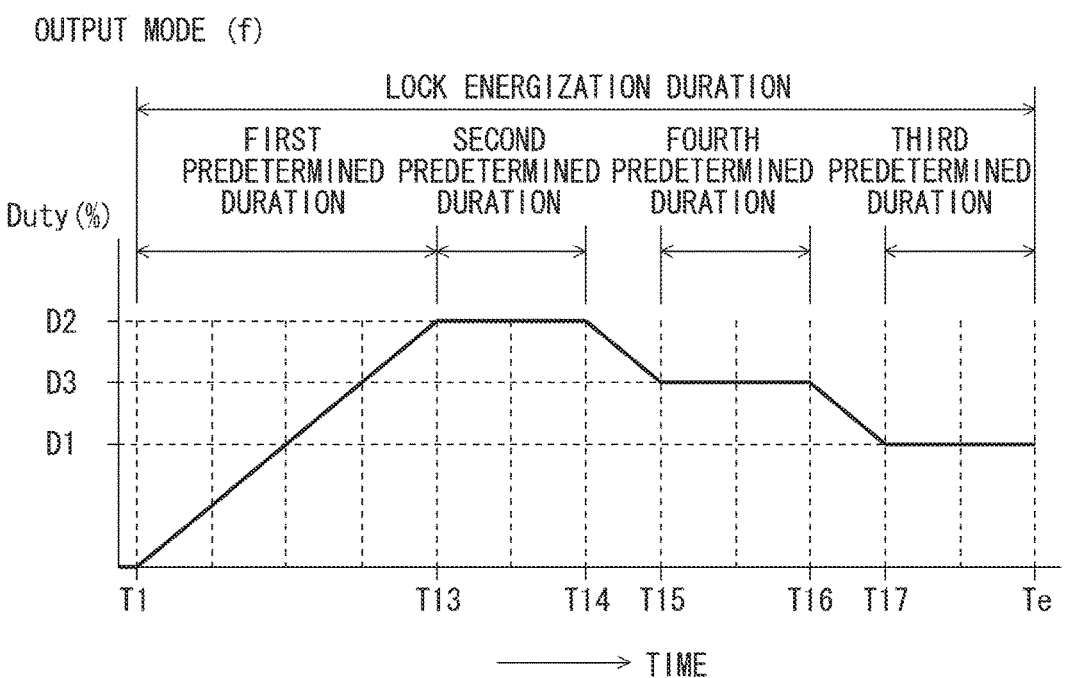
FIG. 10 is a graph illustrating an output mode (f) of the PWM signal according to a modification of the present embodiment.

FIG. 10 is a graph illustrating an output mode (f) of the PWM signal according to a modification of the present embodiment.

As illustrated in FIG. 10, in the output mode (f), duration from a time T1 to a time T13 is first predetermined duration. Duration from the time T13 to a time T14 is second predetermined duration for which a first ON duty D2 is maintained. Duration from a time T15 to a time T16 is fourth predetermined duration for which a third ON duty D3 is maintained. Duration from a time T17 to a time Te is third predetermined duration for which a second ON duty D1 is maintained.

In the output mode (e), for both duration between the second predetermined duration and the fourth predetermined duration (duration from the time T14 to the time T15) and duration between the fourth predetermined duration and the third predetermined duration (duration from the time T16 to the time T17), an ON duty of the PWM signal varies over time. That is, the ON duty of the PWM signal from the time T14 to the time T15 varies from D2 to D3 over time. The ON duty of the PWM signal from the time T16 to the time T17 varies from D3 to D1 over time. Even with this configuration, as described above, the rotor can be smoothly stopped at a lock position.

For only one of the duration between the second predetermined duration and the fourth predetermined duration and the duration between the fourth predetermined duration and the third predetermined duration, the ON duty of the PWM signal may be configured to vary over time.

Figure 11:
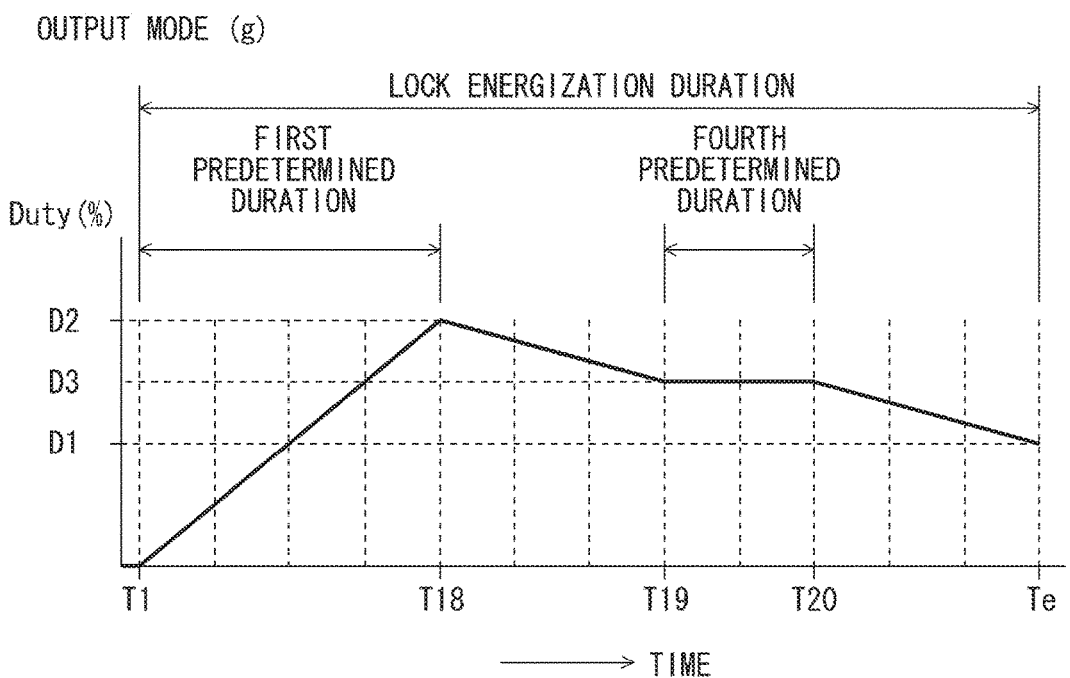
FIG. 11 is a graph illustrating an output mode (g) of the PWM signal according to a modification of the present embodiment.

FIG. 11 is a graph illustrating an output mode (g) of the PWM signal according to a modification of the present embodiment.

As illustrated in FIG. 11, in the output mode (g), duration from a time T1 to a time T18 is first predetermined duration. Duration from a time T19 to a time T20 is fourth predetermined duration for which a third ON duty D3 is maintained. In the output mode (g), a first ON duty D2 and a second ON duty D1 are not maintained. That is, an ON duty of the PWM signal varies over time from the first ON duty D2 to the third ON duty D3 for the duration from the time T18 to the time T19. The ON duty of the PWM signal varies over time from the third ON duty D3 to the second ON duty D1 for the duration from the time T20 to a time Te. That is, at the time Te when lock energization duration is terminated, the PWM signal becomes the second ON duty D1, and a magnitude of a lock current becomes a second predetermined value. Even with this configuration, as described above, the rotor can be smoothly stopped at a lock position.

Figure 12:
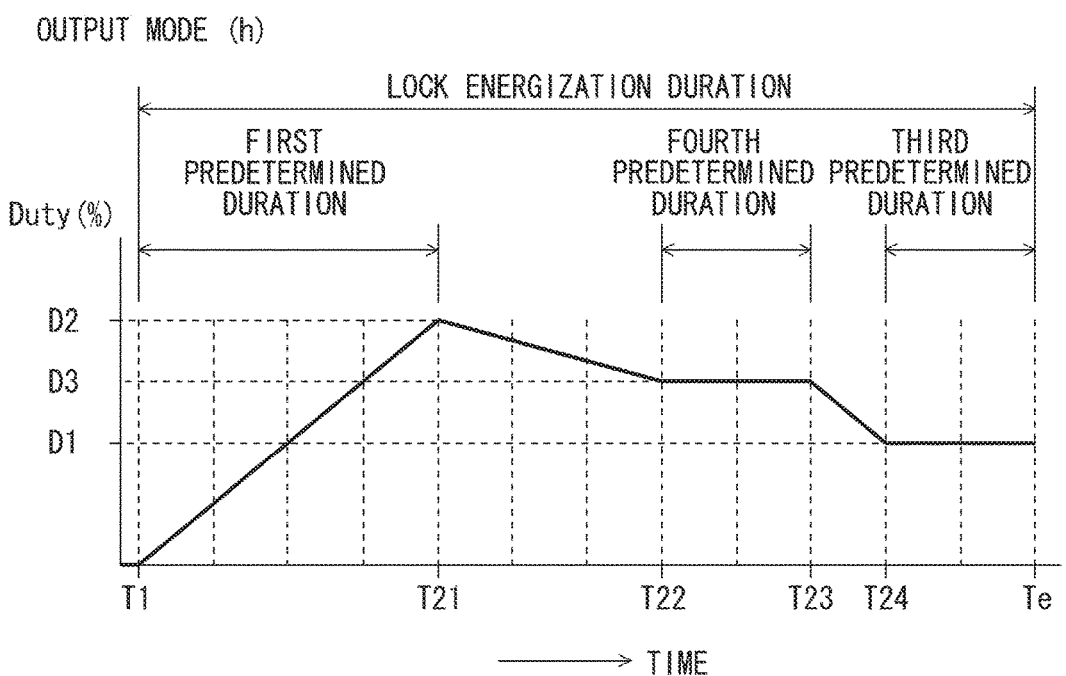
FIG. 12 is a graph illustrating an output mode (h) of the PWM signal according to a modification of the present embodiment.

FIG. 12 is a graph illustrating an output mode (h) of the PWM signal according to a modification of the present embodiment.

As illustrated in FIG. 12, in the output mode (h), duration from a time T1 to a time T21 is first predetermined duration. Duration from a time T22 to a time T23 is fourth predetermined duration for which a third ON duty D3 is maintained. Duration from a time T24 to a time Te is third predetermined duration for which a second ON duty D1 is maintained. In the output mode (h), a first ON duty D2 is not maintained, and an ON duty of the PWM signal varies over time from the first ON duty D2 to the third ON duty D3 for the duration from the time T21 to the time T22. The ON duty of the PWM signal varies over time from the third ON duty D3 to the second ON duty D1 for the duration from the time T23 to the time T24. The second ON duty D1 is maintained after the time T24. Even with this configuration, as described above, the rotor can be smoothly stopped at a lock position.

The ON duty is not limited to a change in three stages as illustrated in FIGS. 9 to 12, and may be controlled to be further changed in multiple stages. That is, when the ON duty is maintained with a magnitude between the first ON duty D2 and the second ON duty D1, the ON duty is not limited to one stage, and may have a plurality of stages. In the case of transition from the ON duty of each stage to the ON duty of the next stage, the ON duty may be controlled to be immediately changed to the ON duty of the next stage at a predetermined time, or be controlled to be gradually changed over time. Whether or not the ON duty of each stage is maintained for predetermined duration, and a length of the maintained duration can be appropriately set.

The motor drive controller is not limited to a circuit configuration illustrated in the above embodiment and the modifications thereof. Various circuit configurations configured to be suitable for the object of the present disclosure may be applied.

For example, variations concerning the control of the duty are not limited to those represented above. The control may be performed such that at least the magnitude of the lock current becomes the first predetermined value when the first predetermined time has elapsed from the start of the lock energization, and becomes the second predetermined value smaller than the first predetermined time when the lock energization is terminated.

In the above embodiment, the pulse signal whose ON duty gradually increases has been described as being output to the gate terminal of the switching element Q1 (the high side switching element of the U phase) of the inverter circuit 2. However, the control mode based on the lock energization control circuit 5 is not limited to the timing chart illustrated in FIG. 4, and the same effects can be obtained if the pulse signals whose ON duty gradually increases are adapted to be output to the switching elements other than the switching element Q1 to properly select the gate drive signals output to the other switching elements.

In a method in which a pulse signal whose ON duty gradually increases is input to one switching element in a set of two switching elements for driving any one of three phases, and a pulse signal, an ON duty of which is gradually put down in opposition to the ON/OFF operation of the one switching element, is output to the other switching element, the same effects can be exerted.

In the above embodiment, the switching elements included in the inverter circuit 2 have been described as the MOSFETs, but are not limited thereto. For example, the switching element may be a bipolar transistor or the like.

The motor driven by the motor drive controller of the present embodiment is not limited to the three-phase brushless motor, but it may be various motors having drive coils of a plurality of phases more than or equal to two phases. A motor of a one-sensor system for detecting a speed of the rotation of the motor, for instance, with an FG sensor or the like without using the sensor for detecting the position of the rotor may also be a drive control target of the motor drive controller of the present embodiment.

The above described flow chart represents an example for describing an operation, and is not limited thereto. The steps illustrated in each figure of the flow chart are specific examples, and are not limited to this flow. For example, the order of each step may be changed, or another process may be inserted between the steps. The processes may be performed in parallel.

Some or all of the processes in the above embodiment may be performed by software, and be performed using a hardware circuit. For example, the control unit is not limited to the microcomputer. The internal configuration of the control unit may be configured such that at least a part thereof is processed by software.

It should be considered that the above embodiment is illustrative and non-restrictive in every respect. The scope of the present disclosure is defined not by the above description but by the claims, and is intended to include all the modifications within the meanings and range equivalent to the claims.

What is claimed is:

1. A motor drive controller that drives a motor without using a sensor device for detecting a position of a rotor, the motor drive controller comprising:

a motor drive unit configured to selectively energize drive coils of a plurality of phases of the motor; and a lock energization control circuit configured to control the motor drive unit to cause a lock current for holding the rotor at a predetermined lock position to flow from the motor drive unit to the drive coils for lock energization duration before rotation of the motor is started, wherein the lock energization control circuit includes:

a first lock energization unit that controls the motor drive unit such that a magnitude of the lock current becomes a first predetermined value when first predetermined duration has elapsed after the lock energization duration is started; and a second lock energization unit that controls the motor drive unit such that the magnitude of the lock current becomes a second predetermined value smaller than the first predetermined value when the lock energization duration is terminated after the first predetermined duration has elapsed.

2. The motor drive controller according to claim 1, wherein the first lock energization unit performs the control such that the magnitude of the lock current increases over a predetermined time until the magnitude becomes a first predetermined value.

3. The motor drive controller according to claim 1, wherein the motor drive unit includes:

an inverter circuit configured to have high side switching elements and low side switching elements that are provided for each phase to apply a drive current to each phase of the drive coils of the plurality of phases; and a pre-drive circuit configured to output drive signals, which control the high side and low side switching elements, to the inverter circuit, and wherein the lock energization control circuit outputs a control signal to the pre-drive circuit to thereby perform the control.

4. The motor drive controller according to claim 3, wherein the lock energization control circuit changes an ON duty of a PWM signal output from the pre-drive circuit to one or both of the high side and low side switching elements provided for a first phase of any one of the drive coils of the plurality of phases, and thereby changes the magnitude of the lock current, wherein the first lock energization unit changes the ON duty of the PWM signal to a first ON duty to thereby perform the control, and wherein the second lock energization unit changes the ON duty of the PWM signal to a second ON duty smaller than the first ON duty to thereby perform the control.

5. The motor drive controller according to claim 4, wherein the pre-drive circuit is controlled by the lock energization control circuit and operates to:

output the PWM signal to the high side switching element of the first phase;

output a low-level drive signal to the low side switching element of the first phase and the high side switching element of each phase other than the first phase; and output a high-level drive signal to the low side switching element of each phase other than the first phase.

6. The motor drive controller according to claim 4, wherein the second lock energization unit maintains a state in which the ON duty of the PWM signal is the first ON duty for second predetermined duration, and then maintains a state in which the ON duty of the PWM signal is the second ON duty for third predetermined duration.

7. The motor drive controller according to claim 6,
wherein a length of the third predetermined duration is longer than or equal to that of the second predetermined duration.

8. The motor drive controller according to claim 6,
wherein the second lock energization unit performs the control such that the ON duty of the PWM signal varies over time for duration between the second predetermined duration and the third predetermined duration.

9. The motor drive controller according to claim 4,
wherein the second lock energization unit maintains a state in which the ON duty of the PWM signal becomes a third ON duty that is smaller than the first ON duty and is larger than the second ON duty for fourth predetermined duration for duration until the ON duty of the PWM signal varies from the first ON duty to the second ON duty.

10. The motor drive controller according to claim 9,
wherein the second lock energization unit performs the control such that the ON duty of the PWM signal varies over time for at least one of duration between the second predetermined duration and the fourth predetermined duration and duration between the fourth predetermined duration and the third predetermined duration.

11. A method for controlling a motor which performs control of causing a lock current for holding a rotor at a predetermined lock position to flow to drive coils for lock energization duration before rotation of the motor is started and selectively energizes the drive coils of a plurality of phases of the motor to drive the motor without using a sensor for detecting a position of the rotor, the method comprising:
a first lock energization step of performing control such that a magnitude of the lock current becomes a first predetermined value when first predetermined duration has elapsed after the lock energization duration is started; and
a second lock energization step of performing control such that the magnitude of the lock current becomes a second predetermined value smaller than the first predetermined value when the lock energization duration is terminated after the first predetermined duration has elapsed.

* * * * *